US012190007B1

(12) United States Patent
Moss

(10) Patent No.: US 12,190,007 B1
(45) Date of Patent: Jan. 7, 2025

(54) PRE-PROCESSING CROP OF IMMERSIVE VIDEO

(71) Applicant: Apple Inc., Cupertino, CA (US)

(72) Inventor: Alan M. Moss, Laguna Beach, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/212,468

(22) Filed: Jun. 21, 2023

Related U.S. Application Data

(60) Provisional application No. 63/356,343, filed on Jun. 28, 2022.

(51) Int. Cl.
| | | |
|---|---|---|
| *G06F 3/14* | (2006.01) | |
| *G06F 3/01* | (2006.01) | |
| *G06F 3/13* | (2006.01) | |
| *G06T 5/20* | (2006.01) | |
| *G06T 5/70* | (2024.01) | |
| *G06T 5/80* | (2024.01) | |
| *G06T 7/70* | (2017.01) | |
| *H04N 23/698* | (2023.01) | |
| *G06V 10/40* | (2022.01) | |

(52) U.S. Cl.
CPC .............. *G06F 3/14* (2013.01); *G06F 3/011* (2013.01); *G06F 3/13* (2013.01); *G06T 5/20* (2013.01); *G06T 5/70* (2024.01); *G06T 5/80* (2024.01); *G06T 7/70* (2017.01); *H04N 23/698* (2023.01); *G06T 2207/20132* (2013.01); *G06T 2207/20192* (2013.01); *G06T 2207/20221* (2013.01); *G06V 10/40* (2022.01)

(58) Field of Classification Search
CPC ... G06T 2207/30244; G06T 7/11; G06T 7/70; G06T 7/174; G06T 3/40; G06T 11/60; G06T 19/20; G06T 7/20; G06T 2207/20132; G06T 2207/20021; G06T 2207/20221; G06F 3/13; G06F 3/011; G06F 16/434; G06F 3/04845; H04N 5/2628; H04N 23/64; H04N 23/698; H04N 21/431; G06V 10/40; G06V 10/44; G06V 10/26; G06V 10/24; G06V 10/22; G06V 10/16; G06V 10/25
See application file for complete search history.

(56) References Cited

U.S. PATENT DOCUMENTS

| | | | | |
|---|---|---|---|---|
| 5,991,456 | A | * | 11/1999 | Rahman .................... G06T 5/20 |
| | | | | 358/448 |
| 10,914,957 | B1 | * | 2/2021 | Stahl ........................ G06F 3/013 |

(Continued)

FOREIGN PATENT DOCUMENTS

WO WO-2021199184 A1 * 10/2021 ......... G02B 27/0172

*Primary Examiner* — Dismery Mercedes
(74) *Attorney, Agent, or Firm* — Fernando & Partners, LLP

(57) ABSTRACT

In one implementation, a method of displaying immersive video is performed at a device having a display, one or more processors, and non-transitory memory. The method includes obtaining an image. The method includes selecting a processing spatial portion of the image based on a predicted pose of the device. The method includes performing image processing on the processing spatial portion. The method includes, after performing image processing on the processing spatial portion, selecting a display spatial portion of the processing spatial portion based on a current pose of the device. The method includes displaying, on the display, the display spatial portion.

23 Claims, 3 Drawing Sheets

(56) References Cited

U.S. PATENT DOCUMENTS

| | | | |
|---|---|---|---|
| 11,527,011 B2* | 12/2022 | Engel | G06T 7/74 |
| 11,627,370 B1* | 4/2023 | Jeong | G06V 20/46 |
| | | | 725/86 |
| 11,962,891 B2* | 4/2024 | Su | G06F 3/012 |
| 2014/0362170 A1 | 12/2014 | Walker | |
| 2017/0115488 A1* | 4/2017 | Ambrus | G02B 27/0172 |
| 2017/0180721 A1* | 6/2017 | Parker | H04N 13/383 |
| 2018/0007422 A1* | 1/2018 | Castleman | H04L 65/764 |
| 2018/0176535 A1* | 6/2018 | Ninan | H04N 21/44218 |
| 2019/0280770 A1* | 9/2019 | Hicks | H04B 10/116 |
| 2020/0090403 A1* | 3/2020 | Ishida | G06F 3/147 |
| 2020/0225473 A1* | 7/2020 | Selan | G02B 27/0172 |
| 2021/0279967 A1 | 9/2021 | Gernoth et al. | |
| 2021/0343036 A1 | 11/2021 | Goto | |
| 2021/0374918 A1* | 12/2021 | Margolis | G09G 3/003 |
| 2022/0277475 A1* | 9/2022 | Zhou | G06V 40/11 |
| 2023/0139216 A1* | 5/2023 | Otsuka | H04N 21/431 |
| | | | 348/39 |

\* cited by examiner

PRE-PROCESSING CROP OF IMMERSIVE VIDEO

CROSS-REFERENCE TO RELATED APPLICATIONS

This application claims priority to U.S. Provisional Patent No. 63/356,343, filed on Jun. 28, 2022, which is hereby incorporated by reference in its entirety.

TECHNICAL FIELD

The present disclosure generally relates to video presentation and, in particular, to systems, methods, and devices for displaying immersive video.

BACKGROUND

When displaying immersive video, the portion of the frame displayed on a display of a device is dependent on a pose of the device. Thus, as a user moves his or her head and a head-mounted device changes pose, the portion of the frame displayed by the device changes such that the user feels immersed in an environment represented by the immersive video.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
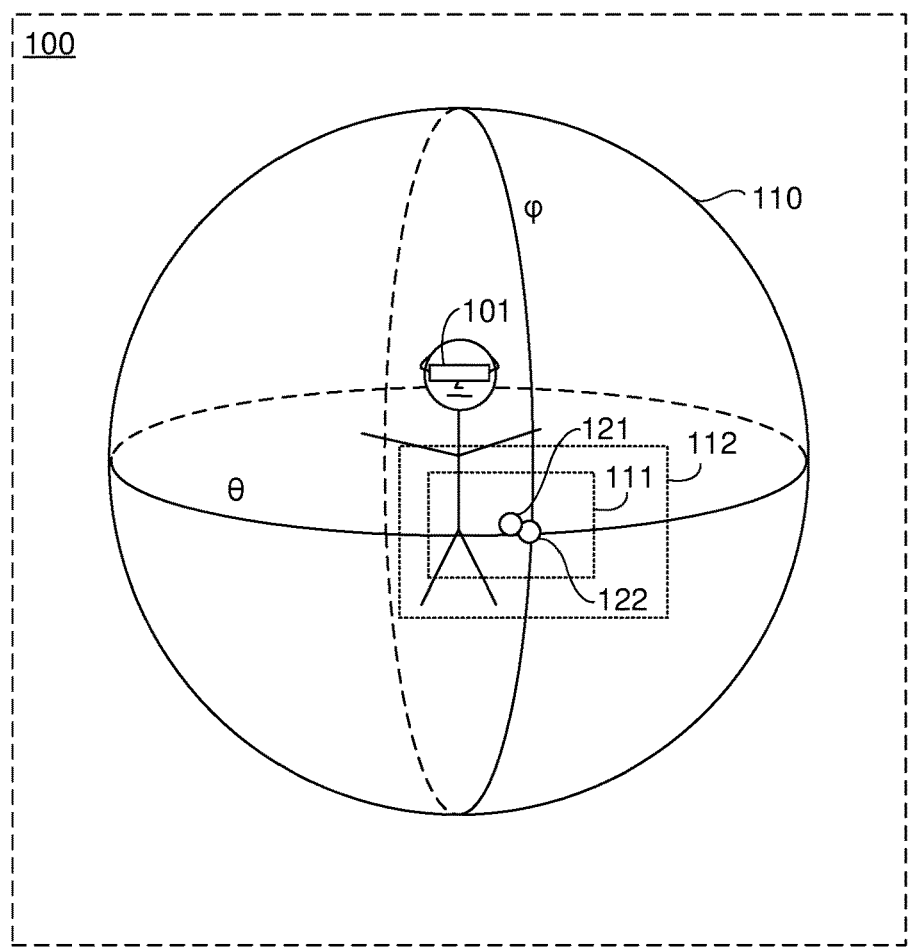
FIGS. 1A and 1B illustrate presentation of immersive video in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting immersive video. In various implementations, a method is performed by a device including a display, one or more processors, and non-transitory memory. The method includes obtaining an image. The method includes selecting a processing spatial portion of the image based on a predicted pose of the device. The method includes performing image processing on the processing spatial portion. The method includes, after performing image processing on the processing spatial portion, selecting a display spatial portion of the processing spatial portion based on a current pose of the device. The method includes displaying, on the display, the display spatial portion.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Immersive video includes a sequence of frames, each frame including a matrix of pixels having respective pixel values. Each pixel in the matrix is associated with a two-dimensional set of coordinates in an image space defining the pixel's location in the matrix. In various implementations, the portion of the frame displayed on a display of a device in a physical environment at any particular time is based on the pose of the device at the particular time in a three-dimensional coordinate of the physical environment.

In various implementations, orientation of the device can be represented by a theta ($\theta$) value defining rotation about a vertical axis, e.g., looking around, and a phi (Q) value defining rotation about a horizontal axis, e.g., looking up or down. In various implementations, the portion of the frame displayed on the display is based on the theta value. In various implementations, immersive video is a 360-degree video including pixels corresponding to any value of the theta value. In various implementations, the portion of the frame displayed on the display is based on theta value and the phi value. In various implementations, immersive video is a 360-degree×360-degree video including pixels corresponding to any values of the theta value and phi value.

In various implementations, immersive video is high-dynamic-range (HDR) video. Accordingly, in various implementations, a frame is processed prior to being displayed. For example, in various implementations, the frame is processed via multi-scale retinex (MSR) for proper color conversion.

Performing such processing on the entire frame can be computationally expensive. Accordingly, in various implementations, such processing is performed only on the portion of the frame that will be displayed based on the pose of device. However, such processing, even when performed on only the portion of the frame that will be displayed, can be time-consuming. Accordingly, the pose of the device can change between the time at which processing is begun and the time at which the portion of the frame is displayed. Thus, in various implementations, a predicted pose of the device at a future time is predicted (e.g., a display time at which the frame is partially displayed) and processing is performed on a portion of the frame including the portion of the frame that would be displayed if the prediction were correct and a surrounding portion of the frame surrounding that portion. At the display time, the current pose of the device is determined, a sub-portion of the portion of the frame (having been processed) is determined based on the current pose of the device, and the sub-portion is displayed.

Figure 1B:
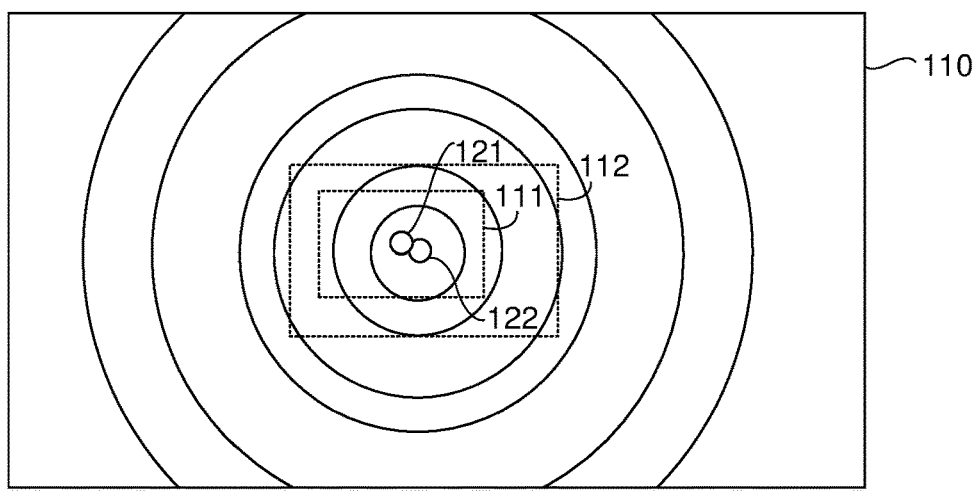

FIG. 1A illustrates a physical environment 100 at a display time in accordance with some implementations. The physical environment 100 includes a user wearing a head-mounted device (HMD) 101. At the display time, while the device pose is a current device pose, the HMD 101 displays a display spatial portion 111 of a frame 110 of immersive video represented, in FIG. 1A, by a sphere. FIG. 1B illustrates the first frame 110 of the immersive video as a rectangular matrix of pixels. The display spatial portion 111 includes a first pixel 121 of the frame 110 corresponding to the current device pose and other pixels within a neighborhood of the first pixel 121.

At a processing time prior to the display time, the HMD 101 predicts a predicted device pose at the display time. In various implementations, the predicted device pose at the display time is the device pose at the processing time. In various implementations, the predicted device pose at the display time is based on the device pose at the processing time and a device pose at another time prior to processing time. For example, in various implementations, the HMD 101 determines a velocity of the HMD 101 based on the device pose at the processing time and the device pose at another time prior to the processing time and determines the predicted device pose at the display time based on the velocity. In FIGS. 1A and 1B, the predicted device pose has a theta value of zero degrees and a phi value of zero degrees.

The HMD 101 selects a processing spatial portion 112 of the frame 110 based on the predicted device pose. The processing spatial portion 112 includes a second pixel 122 of the frame 110 corresponding to the predicted device pose and other pixels within a neighborhood of the second pixel 122. In various implementations, the size of the processing spatial portion 112 is based on an available processing power. In various implementations, the processing spatial portion 112 is larger than the display spatial portion 111. In various implementations, the processing spatial portion 112 includes the display spatial portion 111.

Between the processing time and the display time, the HMD 101 performs image processing on the processing spatial portion 112 of the frame 110. At the display time, the HMD 101 determines the current device pose. In FIGS. 1A and 1B, the current device pose has a theta value of four degrees and a phi value of one degree. After performing image processing on the processing spatial portion 112 of the frame 110 and based on the current device pose, the HMD 101 selects a sub-portion of the processing spatial portion 112 of the frame 110 as the display spatial portion 111 of the frame 110. The HMD 101 displays the display spatial portion 111 of the frame 110 on a display of the HMD 101.

Figure 2:
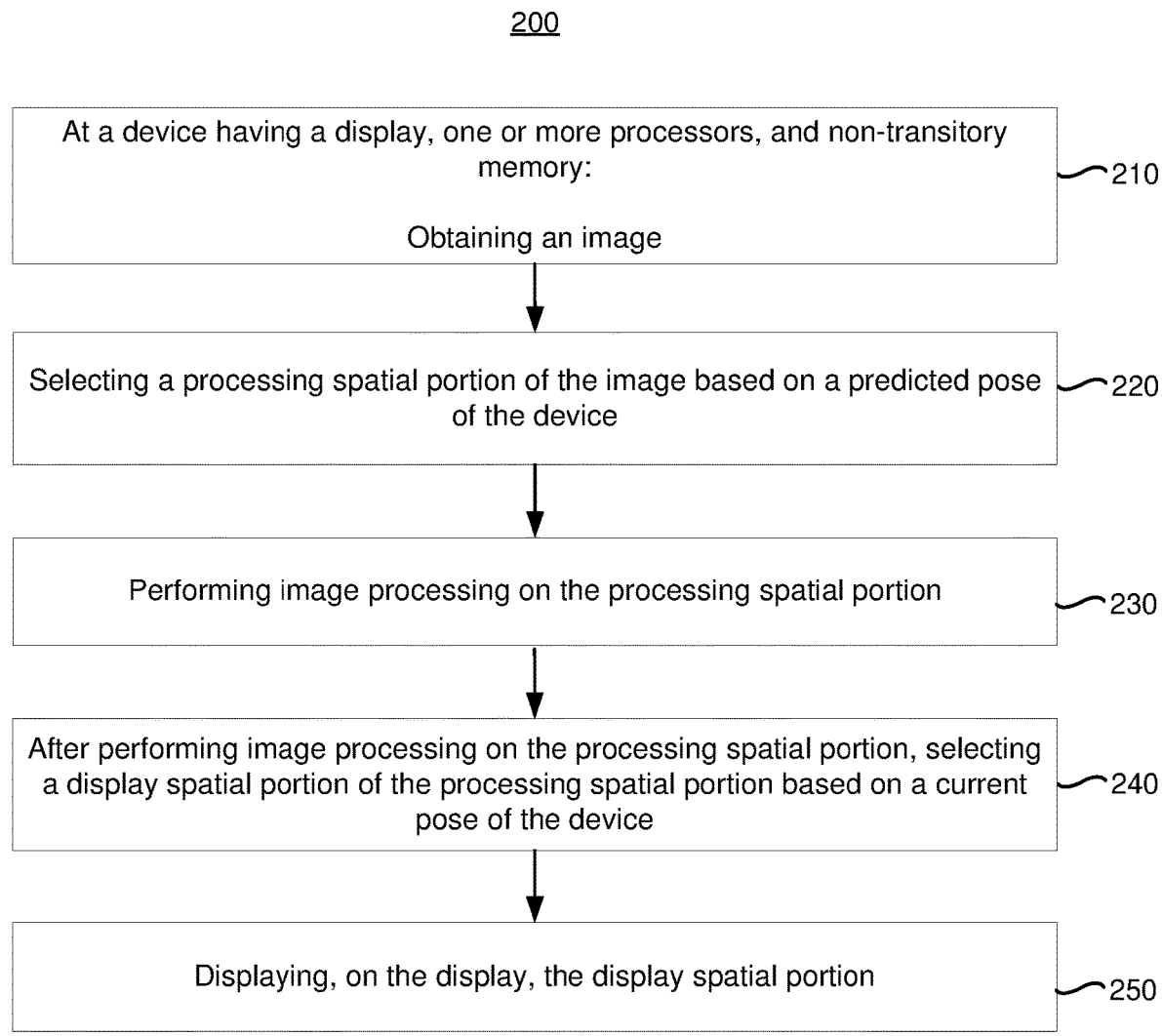
FIG. 2 is a flowchart representation of a method of presenting immersive video in accordance with some implementations.

FIG. 2 is a flowchart representation of a method of presenting immersive video in accordance with some implementations. In various implementations, the method 200 is performed by a device having a display, one or more processors, and non-transitory memory. In some implementations, the method 200 is performed by processing logic, including hardware, firmware, software, or a combination thereof. In some implementations, the method 200 is performed by a processor executing instructions (e.g., code) stored in a non-transitory computer-readable medium (e.g., a memory).

The method 200 begins, in block 210, with the device obtaining an image. In various implementations, the image is a frame of immersive video. In various implementations, the immersive video is 360-degree video. In various implementations, the immersive video is monoscopic in which the same image is presented to two eyes of a user. In various implementations, the immersive video is stereoscopic in which two different images (e.g., captured with a stereoscopic camera) are presented to two eyes of a user.

The method 200 continues, at block 220, with the device selecting a processing spatial portion of the image based on predicted pose of the device. In various implementations, the method 200 includes predicting the predicted pose of the device at a display time at which the image is partially display. In various implementations, predicting the predicted pose of the device is performed at a processing time. In various implementations, the predicted pose of the device at the display time is a pose of the device at the processing time. In various implementations, the predicted pose of the device at the display time is based on a velocity of the device at the processing time. In various implementations, the velocity of the device is determined based on the pose of the device at the processing time and the pose of the device at another time prior to the processing time. In various implementations, the predicted pose of the device at the display time is based on an acceleration of the device at the processing time. In various implementations, the acceleration of the device is determined based on the pose of the device at the processing time and the pose of the device two or more additional times prior to the processing time.

In various implementations, the predicted pose of the device is based on the image, e.g., content displayed at the display time which may attract the attention of a user of the device.

In various implementations, the predicted pose of the device includes an orientation of the device, e.g., the orientation of the device in a three-dimensional coordinate system of a physical environment. In various implementations, the predicted pose of the device includes a theta value defining a rotation about a vertical axis of the three-dimensional coordinate system of the physical environment. In various implementations, the vertical axis is aligned with an axis of gravity. In various implementations, the predicted pose of the device includes a phi value defining a rotation about a horizontal axis of the three-dimensional coordinate system of the physical environment. In various implementations, the predicted pose of the device includes a location of the device, e.g., the location of the device in the three-dimensional coordinate system of the physical environment.

In various implementations, selecting the processing spatial portion based on the predicted pose of the device includes determining one or more processing crop parameters indicating the processing spatial portion. In various implementations, the processing crop parameters include a location in the image, e.g., a set of one or more two-dimensional coordinates in an image coordinate system. In various implementations, the location in the image includes a center of the processing spatial portion. In various implementations, the location in the image includes an upper-left corner of the processing spatial portion. In various implementations, the processing crop parameters includes a size of the processing spatial portion. In various implementations, the location in the image includes an upper-left corner of the processing spatial portion and a lower-right corner of the processing spatial image.

In various implementations, a size of the processing spatial portion is based on an amount of available processing power of the device. In various implementations, the available processing power is based on an amount of time between the processing time and the display time, e.g., the amount of processing that can be performed between the processing time and the display time.

The method 200 continues, in block 230, with the device performing image processing on the processing spatial portion. In various implementations, performing image processing on the processing spatial portion includes performing multi-scale retinex on the processing spatial portion.

In various implementations, the multi-scale retinex is performed as follows:

$$R_i(x_1, x_2) = \sum_{k=1}^{K} W_k(\log I_i(x_1, x_2) - \log[F_k(x_1, x_2) * I_i(x_1, x_2)]) \text{ for } i = 1, \ldots, N$$

where I is the input image, the sub-index i represents the ith spectral band, N is the number of spectral bands (e.g., N=1 for grayscale images and N=3 for typical color images), R is the output of the multi-scale retinex process, $F_k$ represents the kth surround function, $W_k$ are the weights associated with $F_k$, K is the number of surround functions, and * represents the convolution operator.

In various implementations, the surround functions, $F_k$, are given as:

$$F_k(x_1, x_2) = \kappa e(-(x_1^2 + x_2^2)/\sigma_k^2)$$

where $\sigma_k$ are the scales that control the extent of the surround and $\kappa$ is a normalizing constant.

In various implementations, performing image processing on the processing spatial portion includes performing debayering, white balance, defective pixel replacement, flat field correction, filtering (e.g., noise reduction or edge enhancement), distortion correction, and/or chromatic aberration correction.

The method 200 continues, in block 240, with the device, after performing image processing on the processing spatial portion, selecting a display spatial portion of the processing spatial portion based on a current pose of the device. Thus, the device selects a display spatial portion of the (processed) image based on the current pose of the device.

In various implementations, the size of the display spatial portion is smaller than the size of the processing spatial portion. In various implementations, the size of the display spatial portion is based on the size and/or resolution of a display.

In various implementations, the current pose of the device includes an orientation of the device, e.g., the orientation of the device in a three-dimensional coordinate system of a physical environment. In various implementations, the current pose of the device includes a theta value defining a rotation about a vertical axis of the three-dimensional coordinate system of the physical environment. In various implementations, the vertical axis is aligned with an axis of gravity. In various implementations, the current pose of the device includes a phi value defining a rotation about a horizontal axis of the three-dimensional coordinate system of the physical environment. In various implementations, the current pose of the device includes a location of the device, e.g., the location of the device in the three-dimensional coordinate system of the physical environment.

In various implementations, selecting the display spatial portion based on the current pose of the device is based on one or more processing crop parameters indicating the processing spatial portion. For example, in various implementations, selecting the processing spatial portion includes determining, based on the predicted pose of the device, a location in an image coordinate system corresponding to the center of the processing spatial portion. Further, selecting the display spatial portion includes determining, based on the current pose of the device, a location in the image coordinate system corresponding to the center of the display spatial portion. The device determines which location in the processing spatial portion corresponds to the location in the image coordinate system corresponding to the center of the display spatial portion based on the location in the image coordinate system corresponding to the center of the processing spatial portion.

In various implementations, the processing spatial portion and the one or more crop parameters are passed from a crop module to a render module which selects the display spatial portion. In various implementations, the render module performs additional image processing.

The method 200 continues, in block 250, with the device displaying, on the display, the display spatial portion. In various implementations, the device displays the display spatial portion at the display time.

Figure 3:
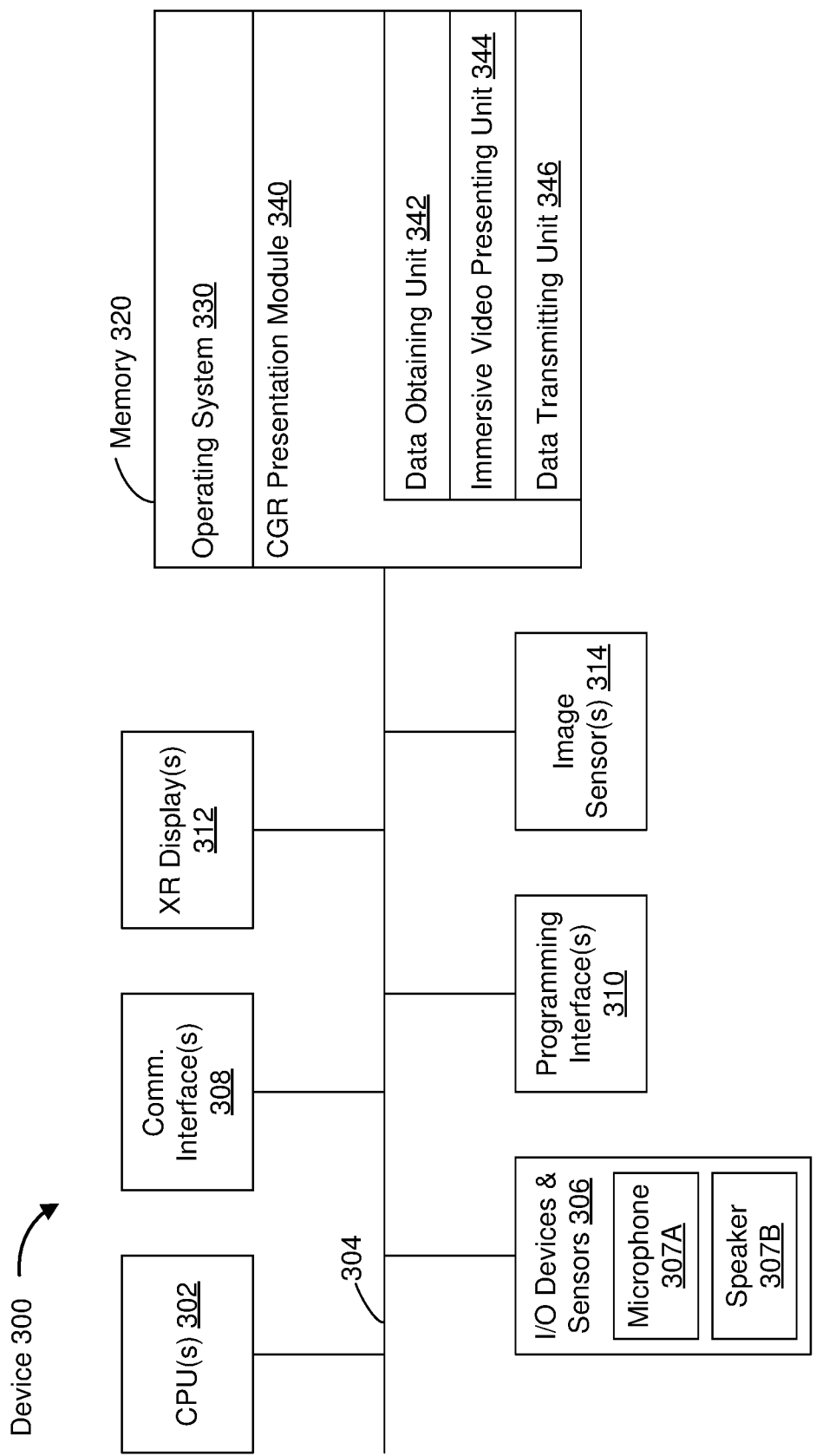
FIG. 3 is a block diagram of an example device in accordance with some implementations.

FIG. 3 is a block diagram of an example of a device 300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more XR displays 312 are configured to display XR content to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the device 300 includes a single XR display. In another example, the device 300 includes an XR display for each eye of the user. In some implementations, the one or more XR displays 312 are capable of presenting XR content such as immersive video.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the device 300 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more CGR displays 312 and/or the I/O devices and sensors 306 (such as the one or more speakers 307B). To that end, in various implementations, the XR presentation module 340 includes a data obtaining unit 342, an immersive video presenting unit 344, and a data transmitting unit 346.

In some implementations, the data obtaining unit 342 is configured to obtain data (e.g., presentation data, interaction data, sensor data, location data, etc.) from the one or more processing units 302, the memory 320, and/or another device. In various implementations, the data obtaining unit obtains immersive video. To that end, in various implementations, the data obtaining unit 342 includes instructions and/or logic therefor, and heuristics and metadata therefor.

In some implementations, the immersive video presenting unit 344 is configured to present immersive video to a user. To that end, in various implementations, the immersive video presenting unit 344 includes instructions and/or logic therefor, and heuristics and metadata therefor.

In some implementations, the data transmitting unit 346 is configured to transmit data (e.g., presentation data, location data, etc.) to the one or more processing units 302, the memory 320, and/or another device. To that end, in various implementations, the data transmitting unit 346 includes instructions and/or logic therefor, and heuristics and metadata therefor.

Although the data obtaining unit 342, the immersive video presenting unit 344, and the data transmitting unit 346 are shown as residing on a single device (e.g., the device 300), it should be understood that in other implementations, any combination of the data obtaining unit 342, the immersive video presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device having a display, one or more processors, and non-transitory memory;
   obtaining an image;
   selecting a processing spatial portion of the image including a first portion based on a predicted pose of the device and having a size corresponding to a size of the display and a second portion surrounding the first portion;
   performing image processing on the processing spatial portion;
   after performing image processing on the processing spatial portion, selecting a display spatial portion of the processing spatial portion based on a current pose of the device, wherein the display spatial portion has a size corresponding to the size of the display and includes part of the first portion and part of the second portion; and
   displaying, on the display, the display spatial portion.

2. The method of claim 1, wherein the image is a frame of immersive video.

3. The method of claim 2, wherein the immersive video is 360-degree video.

4. The method of claim 1, wherein selecting the processing spatial portion of the image includes predicting, at a processing time, the predicted pose of the device at a display time, wherein displaying the display portion is performed at the display time.

5. The method of claim 4, wherein the predicted pose of the device at the display time is a pose of the device at the processing time.

6. The method of claim 4, wherein the predicted pose of the device at the display time is based on a velocity of the pose of the device at the processing time.

7. The method of claim 1, wherein selecting the processing spatial portion includes determining one or more crop parameters indicating the processing spatial portion and selecting the display spatial portion is based on the one or more crop parameters.

8. The method of claim 7, wherein the one or more crop parameters includes a location in the image.

9. The method of claim 7, wherein the one or more crop parameters includes a size of the processing spatial portion.

10. The method of claim 1, wherein a size of the processing spatial portion is based on an available processing power of the device.

11. The method of claim 1, wherein performing image processing on the processing spatial portion includes performing multi-scale retinex.

12. The method of claim 1, wherein performing image processing on the processing spatial portion includes at least one of debayering, white balance, defective pixel replacement, flat field correction, filtering, noise reduction, edge enhancement, distortion correction, or chromatic aberration correction.

13. A device comprising:
    a display;
    a non-transitory memory; and
    one or more processors to:
    obtain an image;
    select a processing spatial portion of the image including a first portion based on a predicted pose of the device and having a size corresponding to a size of the display and a second portion surrounding the first portion;
    perform image processing on the processing spatial portion;
    after performing image processing on the processing spatial portion, select a display spatial portion of the processing spatial portion based on a current pose of the device, wherein the display spatial portion has a size corresponding to the size of the display and includes part of the first portion and part of the second portion; and
    display, on the display, the display spatial portion.

14. The device of claim 13, wherein the one or more processors are to select the processing spatial portion of the image by predicting, at a processing time, the predicted pose of the device at a display time, wherein the one or more processors are to display the display portion at the display time.

15. The device of claim 13, wherein the one or more processors are to select the processing spatial portion by determining one or more crop parameters indicating the processing spatial portion and the one or more processors are to select the display spatial portion based on the one or more crop parameters.

16. The device of claim 15, wherein the one or more crop parameters includes a location in the image.

17. The device of claim 15, wherein the one or more crop parameters includes a size of the processing spatial portion.

18. The device of claim 13, wherein a size of the processing spatial portion is based on an available processing power of the device.

19. The device of claim 13, wherein the one or more processors are to perform image processing on the processing spatial portion by performing multi-scale retinex.

20. The device of claim 13, wherein the one or more processors are to perform image processing on the processing spatial portion by performing at least one of debayering, white balance, defective pixel replacement, flat field correction, filtering, noise reduction, edge enhancement, distortion correction, or chromatic aberration correction.

21. A non-transitory memory storing one or more programs, which, when executed by one or more processors of a device with a display, cause the device to:
    obtain an image;
    select a processing spatial portion of the image including a first portion based on a predicted pose of the device and having a size corresponding to a size of the display and a second portion surrounding the first portion;
    perform image processing on the processing spatial portion;
    after performing image processing on the processing spatial portion, select a display spatial portion of the processing spatial portion based on a current pose of the device, wherein the display spatial portion has a size corresponding to the size of the display and includes part of the first portion and part of the second portion; and display, on the display, the display spatial portion.

22. The non-transitory computer-readable medium of claim 21, wherein the programs, when executed, cause the device to perform image processing on the processing spatial portion by performing multi-scale retinex.

23. The non-transitory computer-readable medium of claim 21, wherein the programs, when executed, cause the device to perform image processing on the processing spatial portion by performing at least one of debayering, white balance, defective pixel replacement, flat field correction, filtering, noise reduction, edge enhancement, distortion correction, or chromatic aberration correction.

* * * * *